United States Patent [19]
Ross

[11] 3,984,622
[45] Oct. 5, 1976

[54] MULTI-CONDUCTOR CABLE HARNESS WITH WOVEN BREAKOUT COVER AND METHOD OF MAKING SAME

[75] Inventor: Edgar A. Ross, Greenville, S.C.
[73] Assignee: Southern Weaving Company, Greenville, S.C.
[22] Filed: Feb. 20, 1976
[21] Appl. No.: 659,800

[52] U.S. Cl................................. 174/72 A; 29/624; 156/51; 174/117 M; 339/148
[51] Int. Cl.²...................... H02G 3/02; H01B 7/00; H01B 13/00
[58] Field of Search.......... 174/72 A, 117 R, 117 F, 174/117 M; 339/148; 29/624, 203 MW; 156/47, 51, 52

[56] References Cited
UNITED STATES PATENTS
| | | | |
|---|---|---|---|
| 311,611 | 2/1885 | Sawyer | 339/148 X |
| 2,166,420 | 7/1939 | Robertson | 174/72 A |
| 2,299,140 | 10/1942 | Hanson | 174/72 A |
| 3,654,380 | 4/1972 | Tatum et al. | 174/117 F X |

OTHER PUBLICATIONS
Brochure entitled "Woven Electronics" published by Woven Electronics, a division of Southern Weaving Company, 6 pages, Feb. 21, 1972.

Primary Examiner—Laramie E. Askin
Attorney, Agent, or Firm—Bailey, Dority & Flint

[57] ABSTRACT

A multi-conductor cable harness includes a trunk having a woven cover enclosing a plurality of conductor wires, and a series of reduced trunk cover segments extended therefrom. Branches of wires are broken out of the woven cover at junctions of adjacent reduced segments so as to be spaced laterally, longitudinally and vertically with respect to each other. The branch portions are accurately separated into distinct branches for providing programmed connections for the conductor wires.

13 Claims, 5 Drawing Figures

U.S. Patent  Oct. 5, 1976  3,984,622
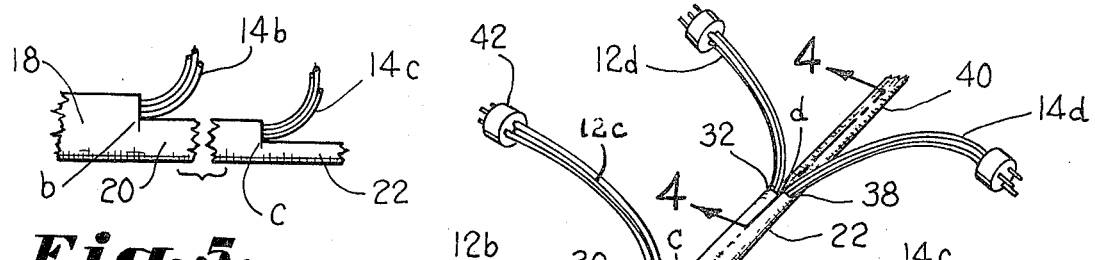
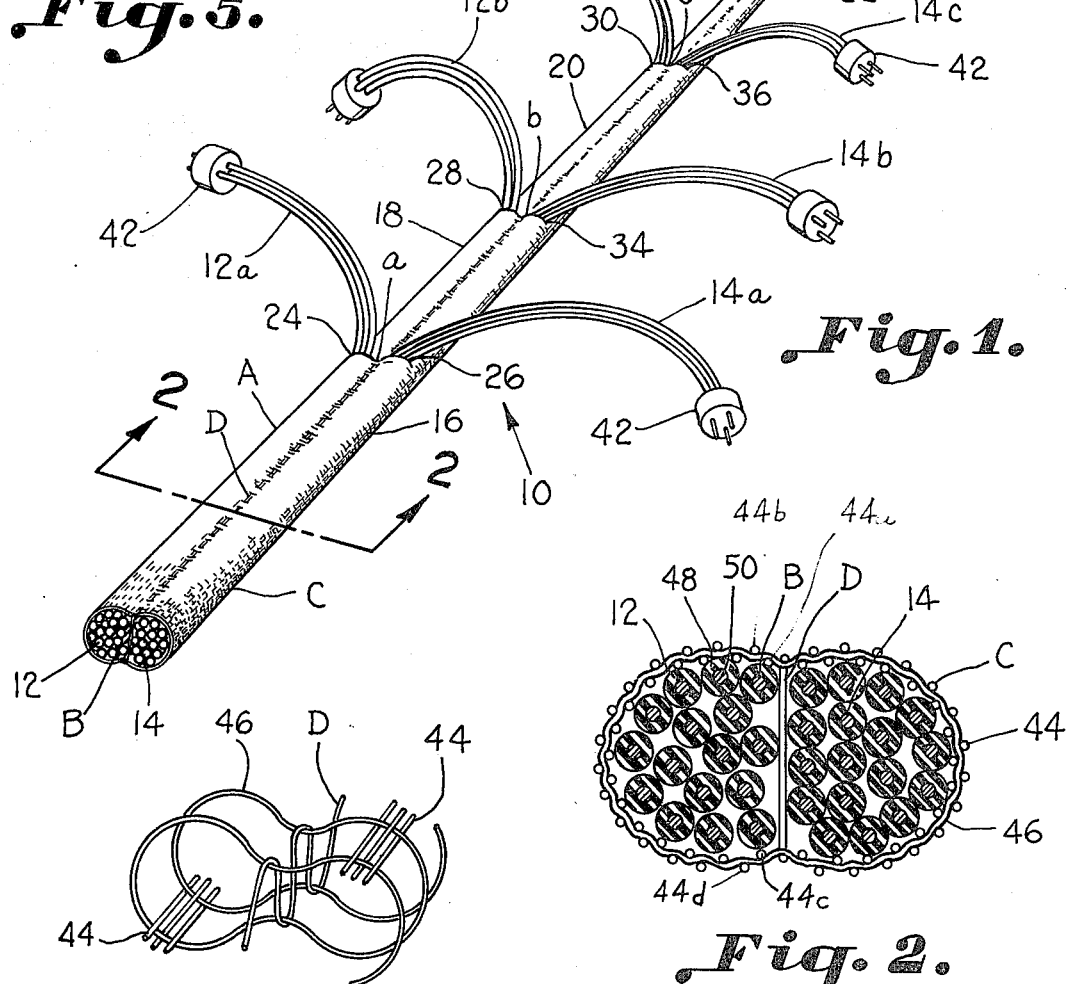
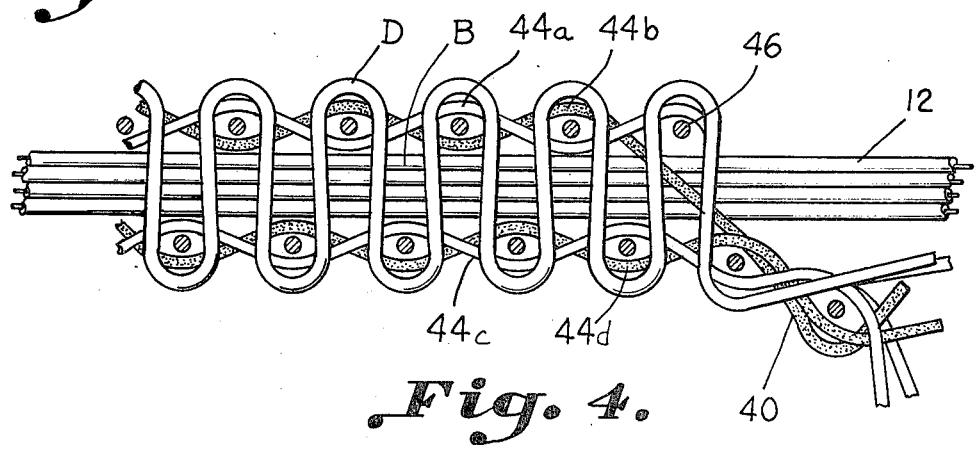

MULTI-CONDUCTOR CABLE HARNESS WITH WOVEN BREAKOUT COVER AND METHOD OF MAKING SAME

BACKGROUND OF THE INVENTION

In many cable harness and trunk assemblies a large number of individual conductor wires are carried therein. Keeping the conductor wires separated so that they may be connected to proper terminals on remote ends of the cable trunk is a problem to which considerable attention must be given.

Heretofore, wire harness assemblies have been provided wherein a plurality of insulated conductors are held together in a main trunk with branchout groups of conductors being separated from the main trunk to provide accurate connections to desired terminals. One such harness assembly is shown in United States Letters Patent No. 3,627,903 wherein insulated conductors are assembled in side-by-side parallel relation to define a main trunk by warp and weft filaments of thermoplastic material integral with one another and with the conductors. The branchout group of conductors is separated from the main trunk by severing the weft filaments with a heated thin blade. The remaining conductors of the main trunk and the conductors of the branchout group remain secured together by weft and warp filaments interwoven with the conductors which have been heat fused together by the hot severing. Such an arrangement is mainly suitable for a relatively small number of conductor wires in a side-by-side configuration. However, separating conductors from such a harness assembly can result in tearing or puncturing the basic primary insulation surrounding the conductor wires during the heat severing process.

SUMMARY OF THE INVENTION

The invention relates to a multi-conductor cable harness having a trunk portion including a plurality of conductor wires and a plurality of warp strands and filling strands woven about the conductor wires forming a woven cover enclosing and binding the conductor wires therein. A warp binder strand woven in the trunk cover separates the conductor wires within the cover to define a first and second group of wires on respective first and second sides of the binder strand. A plurality of conductor wire branch portions are broken out from the trunk portion from within each group at terminal openings spaced at intervals along the length of the trunk portion. Therefore, a set of branches is defined on each of the first and the second sides of the binder having lateral separation relative to each other. The branches within each set are longitudinally spaced along the length of the trunk portion. The trunk portion is progressively reduced in cross-sectional size following each of the terminal openings and branch portions as the conductor wires are broken out from the interior of the trunk portion. The woven cover of the reduced trunk portions encloses and binds only the remaining conductor wires providing vertical spacing of respective branch portions along the length of the trunk portion.

Thus, the branch portions are separated relative to each other in three directions; laterally, longitudinally and vertically.

Accordingly, an important object of the present invention is to provide a highly versatile and flexible multi-conductor cable harness wherein a large number of conductor wires may be harnessed and broken out into accurately separated branch portions.

Another important object of the present invention is to provide a multi-conductor cable harness having a woven cover with longitudinally spaced segments of progressively reduced cross-section wherein conductor wire branches extend through openings provided in the cover adjacent the segment junctions for being accurately separated into distinctive branches.

Another important object of the present invention is to provide a multi-conductor cable harness having a plurality of conductor wire branch portions broken out from a trunk portion wherein the branch portions are separated laterally, longitudinally, and vertically with respect to each other.

Another important object of the present invention is to provide a multi-conductor cable harness wherein a large number of conductor wires may be broken out from the harness into accurately separated branches for insured accuracy and reliability in making programmed connections thereto.

Another object of the present invention is the provision of a unique method of separating a plurality of wires within a woven cover of a multi-conductor cable harness into two groups and then breaking out a plurality of branch portions from each group providing accurately separated branches for making programmed connections.

BRIEF DESCRIPTIONS OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is an enlarged perspective view illustrating one end of a multi-conductor cable harness constructed in accordance with the present invention, FIG. 2 is a sectional elevational view taken along the line 2—2 of FIG. 1, FIG. 3 is a perspective view illustrating the interweaving of the warp and filling strands of a woven cover for a multi-conductor cable harness constructed in accordance with the present invention, FIG. 4 is an enlarged sectional elevational view taken along line 4—4 of FIG. 1, and FIG. 5 is an enlarged partial side elevational view illustrating a multi-conductor cable harness constructed in accordance with the present invention having vertically and longitudinally spaced junctions between adjacent reduced trunk segments.

DESCRIPTION OF A PREFERRED EMBODIMENT

The invention relates to electrical cable harness formed by weaving techniques, and more particularly to cable harnesses wherein a plurality of conductor wires are enclosed having separated branch portions broken out from the harness trunk providing accurate connections to the conductors. Such harnessed cables have many industrial and commercial applications where large numbers of relatively small wires need to be carried to proper terminals such as in the wiring of computers, aircraft, ships, machinery, and telephone and other communication systems.

The drawing illustrates a multi-conductor cable harness designated generally at 10, including a trunk A for harnessing a plurality of loose conductor wires B having a woven trunk cover C enclosing and binding the conductor wires therein. A warp binder strand D is woven in the trunk cover C separating the plurality of conductor wires B within the cover to define a group of the wires 12 and 14, respectively, on each side of the binder strand D. The cable harness 10 may be formed in a round, flat, or a folding configuration depending on the particular application. In the preferred embodiment, a substantially round or oval-shaped configuration is provided wherein the warp binder strand D separates the wires into the first group of wires 12 and the second group of wires 14 on respective first and second sides of the binder strand. It is to be understood, of course, that additional warp binder strands may be utilized to provide further sub-grouping of the plurality of wires B within the woven cover C. The number of warp binder strands D utilized and the number of groups of wires separated within the cover C depends on the number of wires sought to be harnessed in accordance with the present invention. Separation into two groups as illustrated may be sufficient, for example, for up to 56 conductor wires of the type 24 AWG, whereas further sub-grouping may be desired for upwards of up to 250 wires.

The harness trunk A includes a main trunk portion 16 enclosing the entire number of the plurality of wires B, and a series of progressively reduced trunk portions 18, 20 and 22 having longitudinal spacing. A pair of conductor wire branch portions 12a and 14a are broken out of the main trunk portion 16 from within each group 12 and 14, respectively. The branch portions 12a and 14a extend through intermediate terminal breakout openings 24 and 26 formed in the woven cover C at the junction of trunk portion 16 and the reduced trunk portion 18. The terminal openings 24 and 26 are laterally spaced on either side of the warp binder strand D providing lateral spacing of the branch portions 12a and 14a. the reduced trunk portion 18 has a reduced cross-sectional size following the breakout of branch portions 12a and 14a since it includes only the remaining wires. The woven cover of the reduced trunk portion 18 is continuously woven to enclose and bind the remaining wires.

The harness A may be constructed without the binder strand D in which case lateral separation of the branch portions will be provided solely by the lateral spacing of the breakout openings. However, binder strand D provides further definition and accuracy of separation by sub-grouping within the cover C.

The woven harness cover C includes a plurality of continuously woven, longitudinally spaced segments covering the wires of the reduced trunk portions 18, 20, 22. These cover segments are progressively reduced as they enclose and bind only the remaining wires following the breakout of branches at the ends thereof. The reduced cover segments define stepped descending junctions at a, b, c, and d between adjacent trunk portions. The junctions thus defined have vertical and longitudinal spacing therebetween.

The intermediate terminal openings 24 and 26 are preferably formed by weaving the cover portion C around the breakout branch portions 12a and 14a, however, it is to be understood that other forms of openings may be provided in the woven cover for breaking out the branch portions.

Additional branch portions 12b, 12c and 12d are broken out of the trunk portion A from the first group of wires 12 to define a first set of branches including branch 12a. The branches 12b–12d extend through intermediate terminal openings 28, 30 and 32 formed in the cover C at spaced intervals along the length of the trunk corresponding to junctions b, c, and d.

A second set of branches is defined by branch portions 14b through 14d broken out from the second group of wires 14 and includes branch 14a. The branches 14b–14d extend through intermediate terminal openings 34, 36 and 38 formed at junctions b, c, and d, respectively. The breakout openings 34, 36, 38 are laterally spaced from the openings 28, 30, 32 formed on the opposite side of the binder strand. Thus the first and second set of branches are laterally spaced relative to each other. The branches within each set are spaced vertically and longitudinally with respect to each other.

Since the junctions of adjacent reduced cover and trunk segments, a, b, c, and d, are vertically and longitudinally spaced, so are the branches of wires extending through the breakout openings formed at the junctions. For example, the branch portions 12b and 14b will be spaced vertically above and longitudinally from branches 12c and 14c, while the branches 12b and 12c are laterally spaced from branches 14b and 14c. Thus, the branch portions 12a through 12d, and 14a through 14d are spaced laterally, vertically and longitudinally along the length of the trunk A.

Although adjacent branch portions 12a and 14a through 12d and 14d are broken out in exact lateral alignment with each other, it is also possible that the intermediate terminal openings, 24 and 26 for example, may be staggered to provide further separation for the breakout branch portions. The number of branch portions formed and the location thereof depend upon the number of wires being handled and the desired locations of the connections made thereto.

The woven harness cover C terminates in a woven tab portion 40 extending past the last branch portions 12d and 14d providing a means for structurally attaching the woven cable and reducing the tensile stress on the conductor wires carried thereby.

While only one end of the woven breakout harness and cable is illustrated in the drawings, it is to be understood that corresponding branch portions could be broken out from the other end of the harness. The lateral, longitudinal and vertical separation of the branch portions provide accurately programmed connections between the conductor wires and the proper terminals on each end of the trunk A. The accurate separation of the branch portions reduces the confusion that might otherwise occur when large numbers of conductor wires are sought to be matched to their proper terminals on the remote opposing ends of an extended length of trunk line. The branch portions may be provided with connection adapters 42 to facilitate their connection to the proper terminals.

The woven harness cover C which encloses and binds the conductor wires to harness them therein is formed from weaving a plurality of warp strands 44 repeatedly over and then under a single filling strand 46 which is woven around the wires in a continuous strand. This provides a woven cable harness having a smooth rounded outer surface eliminating the selvage that accompanies other weaving techniques. The weaving technique and the particular woven pattern of the filling and warp strands 46 and 44 constructed in accordance with the present invention are best shown in FIG. 4, wherein warp strands 44a, 44b, 44c, 44d pass alternately over and then under the filling strand 46 forming a tight woven loop thereabout around the entire periphery of the conductor wires. The warp and filling strands may be any suitable weaving material such as nylon, polyester, or glass filaments.

Adjacent strands of the warp strand 44 are parted around each branch portion while the filling strand is continuously woven behind and then in front of the branch to form each respective breakout opening. The warp and filling strands 44 and 46 are then continuously woven after each breakout opening to form the reduced cover segments of reduced trunk portions 18, 20, 22.

The conductor wires B carried within the woven cover include a conventional layer of insulation 48 enclosed around a conducting wire 50. The outside insulation layer 48 may be color coded in a conventional manner to enhance the accurate separation and connection of the conductor wires.

Thus, it can be seen that a highly versatile and flexible construction for a woven breakout harness can be had in accordance with the present invention wherein a large number of conductor wires may be broken out into branch portions having separation in three dimensions for accurate connection to the proper terminals.

While a preferred embodiment of the invention has been described using specific terms, such description is for illustrative purposes only, and it is to be understood that changes and variations may be made without departing from the spirit or scope of the following claims.

What is claimed is:

1. A multi-conductor cable harness comprising:
   a woven cover including a main trunk cover portion woven about a plurality of conductor wires and enclosing and binding said conductor wires;
   a series of longitudinally spaced trunk cover segments of progressively reduced cross-section following said main trunk cover portion, said reduced cover segments defining stepped descending junctions between adjacent segments having vertical and longitudinal spacing therebetween;
   a plurality of breakout openings formed in said woven cover at each said junction having lateral separation therebetween, said breakout openings being spaced in said vertical and longitudinal directions along the length of said woven cover; and
   a conductor wire branch portion broken out from said harness from each said breakout opening so that said branch portions are laterally, longitudinally and vertically spaced by said woven cover;
   whereby said conductor wires are accurately separated into distinct branches for providing programmed connections for said conductor wires.

2. The structure set forth in claim 1 wherein said woven cover is continuously woven to bind the remaining of said conductor wires following each breakout branch portion to define said reduced segments.

3. The structure set forth in claim 1 wherein said woven cover is defined by a plurality of warp strands woven with a single continuous filling strand.

4. The structure set forth in claim 3 wherein adjacent warp strands of said woven cover are parted around each said branch portion and said filling strand is continuously woven behind and in front of each said branch portion to define said breakout opening.

5. The structure set forth in claim 1 wherein said woven cover terminates in a woven tab portion extending past a last breakout opening for structurally mounting said cable and for providing strain relief to said conductor wires.

6. A multi-conductor cable harness comprising:
   a woven cover having a trunk portion enclosing and binding a plurality of conductor wires;
   a warp binder strand woven in said trunk portion of said cover separating said conductor wires within said cover to define a first and second group of said wires on respective first and second sides of said binder strand;
   a plurality of laterally spaced breakout openings formed in said woven cover at spaced intervals along the length thereof;
   a plurality of conductor wire branch portions broken out of said woven cover from each group at said breakout openings to define a set of branches on each of said first and second sides having lateral separation relative to each other, said branches within each set being longitudinally spaced along the length of said trunk portion;
   said trunk portion being progressively reduced in size following each breakout of branch portions, said woven cover of said reduced trunk portions being continuously woven to enclose and bind only the remaining wires following each breakout providing vertical spacing between the branch portions along the length of said trunk portion;
   whereby said conductor wires are accurately separated into distinct branches having spacing in three directions, lateral, longitudinal, and vertical, to provide programmed connections to said conductor wires.

7. The structure set forth in claim 6 wherein said woven cover of said trunk portion terminates in a woven tab portion extending past a last breakout opening for structurally mounting said cable and for providing strain relief to the conductor wires carried thereby.

8. A method of accurately separating a plurality of conductor wires into distinctly identifiable branches to provide programmed connections thereto comprising:
   providing a trunk portion by forming a main trunk segment having a woven cover constructed around said plurality of conductor wires and forming a series of reduced trunk segments having progressively reduced cross-sections following said main trunk segment;
   said reduced trunk segments providing a series of stepped descending junctions between adjacent trunk segments being vertically and longitudinally spaced;
   forming a pair of laterally spaced breakout openings at each said junction of said trunk segments whereby said breakout openings are spaced laterally, longitudinally and vertically with respect to each other;
   breaking out a branch of said conductor wires from within said woven cover at said breakout openings to define two sets of branches having lateral spacing with the branches within each set having longitudinal and vertical spacing along the length of said trunk portion; and
   continuously weaving said woven cover to enclose and bind the remaining wires following each branch breakout to form said reduced trunk segments.

9. The method of claim 8 further comprising providing a woven binder strand along a length of said main and reduced trunk segments to further separate and distinguish said conductor wires within said trunk and branch portions.

10. A multi-conductor cable harness comprising:
a woven cover having a main trunk portion enclosing and binding a plurality of conductor wires, said woven cover being defined by warp and filling strands woven around said wires;
a plurality of longitudinal trunk segments of progressively reduced cross-sectional size extending in series from said main trunk portion;
a pair of laterally spaced terminal breakout openings formed in said woven cover at longitudinally spaced junctions of adjacent reduced trunk portion segments;
a conductor wire branch portion broken out of said woven cover from within said trunk portion at each said terminal breakout opening to define two sets of substantially parallel branches having lateral separation, the branches within each set being longitudinally spaced along the length of said trunk portion; and
the woven cover of said reduced trunk segments being continuously woven following each pair of breakout branches to enclose and bind the remaining wires providing further spacing for said branch portions in a vertical direction along the length of said trunk portion;
whereby said conductor wires are accurately separated into distinct branches having spacing in three directions for providing programmed connections thereto.

11. The structure set forth in claim 10 further comprising a woven tab portion extending past a last of said terminal breakout openings for providing structural mounting of said cable and for reducing the tensile stress on connected conductor wires.

12. The structure set forth in claim 10 further comprising a warp binder strand formed in said woven cover separating said plurality of conductor wires into a group of said wires on each side of said binder strand, said binder strand passing between said laterally spaced terminal breakout openings further separating and distinguishing said terminal breakout openings.

13. The structure set forth in claim 1 wherein said woven cover further comprises a warp binder strand woven in said cover separating said conductor wires within said woven cover to define a group of said wires on each side of said binder strand, said breakout openings being laterally spaced on opposing sides of said binder strand whereby one said conductor branch portion is broken out of each group providing further definition of separation.

* * * * *